United States Patent [19]

Brinkman

[11] Patent Number: 4,666,369
[45] Date of Patent: May 19, 1987

[54] APPARATUS FOR SEALING JOINTS OF A STEAM TURBINE SHELL

[75] Inventor: Earl H. Brinkman, Schenectady, N.Y.

[73] Assignee: General Electric Company, Schenectady, N.Y.

[21] Appl. No.: 714,238

[22] Filed: Mar. 21, 1985

[51] Int. Cl.⁴ .............................................. F01D 11/00
[52] U.S. Cl. .................................... 415/135; 415/101
[58] Field of Search ............ 415/134, 135, 101, 219 R, 415/170 R, 173 R, 174, 113, 136

[56] References Cited

U.S. PATENT DOCUMENTS

| 1,352,278 | 9/1920 | Junggren | 415/135 |
| 2,651,496 | 9/1953 | Buckland et al. | 415/135 |
| 3,724,969 | 4/1973 | Shulock | 415/219 R |
| 4,243,233 | 1/1981 | Arai | 415/174 |

FOREIGN PATENT DOCUMENTS

| 176401 | 10/1953 | Austria | 277/158 |
| 35204 | 3/1983 | Japan | 415/134 |
| 206806 | 12/1983 | Japan | 415/173 R |
| 2034415 | 6/1980 | United Kingdom | 415/135 |

Primary Examiner—Robert E. Garrett
Assistant Examiner—John Kwon
Attorney, Agent, or Firm—Jerome C. Squillaro

[57] ABSTRACT

Apparatus for sealing a joint between two components of a fluid turbine comprises a member having a surface contour conforming to at least a portion of a first mateable surface of one component, a biasing element for urging the member against the first mateable surface and a relieved feature terminating in a second mateable surface of the other component so that portions of the first and second mateable surfaces may sealingly engage. The apparatus may be disposed in the radially inward portion of a turbine shell and the area around the member may be relieved to accommodate unequal circumferential expansion between the radially inner and outer portion of the shell while maintaining sealing engagement between the first and second mateable surfaces.

28 Claims, 3 Drawing Figures

APPARATUS FOR SEALING JOINTS OF A STEAM TURBINE SHELL

BACKGROUND OF THE INVENTION

This invention relates to apparatus for sealing joints of a steam turbine shell and, more particularly, to apparatus for sealing wherein bolting forces are inadequate to ensure an efficient seal, and further wherein the apparatus may be disposed skewed with respect to the axis of rotation of the rotor of the turbine.

In general, steam turbines operate to convert energy stored in high-pressure, high-temperature steam into rotational mechanical movement. Steam turbines employed by electric utilities in the generation of electric power, typically comprise a plurality of turbine blades, or buckets, radially mounted on the periphery of a rotor shaft and disposed so as to form a plurality of bucket wheels. The rotor shaft, with associated bucket wheels, is mounted on bearings with the bucket wheels disposed inside an inner shell which is in turn surrounded by a spaced apart outer shell. This double shell configuration forms a pressurizable housing in which the bucket wheels rotate and prevents potentially damaging thermal gradients. The bucket wheels are disposed between stationary nozzle rings which are formed by circular arrays of stationary curved partitions substantially radially disposed between and fixedly retained by a pair of concentric diaphragm rings. These partitions are generally referred to as nozzle partitions and the spaces between the partitions as nozzles. As steam flows through the interior cavity of the pressurizable inner shell, it alternately passes through sequences of stationary nozzle partitions and rotating turbine bucket wheels to produce rotational movement of the rotor shaft. The combination of a pair of diaphragm rings with their associated partitions and the cooperating row of buckets is generally referred to as a stage, stages being numbered sequentially in the direction of steam flow starting from the steam input region. These concepts are elementary and are generally well known in the turbine art.

Modern large steam turbines generally comprise several sections such as, for example, high-pressure, intermediate pressure, low-pressure and reheat. These sections possess various design characteristics so as to permit extraction of the optimum amount of energy from the expansion of steam through the respective turbine sections, thereby optimizing overall turbine efficiency. It is common practice to have one or more of these sections configured in a double flow arrangement, in which steam entering a middle portion, or tub, of the section encounters a diverging flow path. After entry into this middle portion of one of the turbine sections, steam exits in substantially opposite directions, wherein the oppositely directed steam flows are used to impart rotation in the same direction to the turbine shaft. Thus, for example, steam entering from the top or bottom of a turbine section having a horizontally disposed rotor exits toward the left and right to flow generally axially through the turbine. This double flow configuration beneficially contributes to overall machine efficiency.

The inner shell of a double flow reheat section of a turbine may be configured to provide an annular chamber for receiving and circumferentially distributing steam entering the reheat section. The inner wall of the annular chamber is configured to direct steam into the entrance region for the opposing nozzle partitions of the first stage of the reheat section. Typically the inner shell may be configured in axially extending sections, such as halves, for ease of construction and assembly. One half is generally disposed such that when the other half is abutted to it, the joint between the halves is substantially horizontal. Although the apparatus of the present invention will be described with respect to its application to a horizontal joint, it is to be understood that the apparatus of the present invention is not so limited and may be used for sealing a joint regardless of the spatial orientation of the joint. In addition, for ease of manufacture, generally a major portion of the inner shell is a casting. However, the apparatus of the present invention may be used for sealing a joint between portions of turbine components, regardless of the methods employed to fabricate the portions of components.

The mating horizontal joint surfaces of the inner shell may be tightly secured to each other by providing a bolting flange along the outer periphery of the joint. However, there is a maximum distance from a bolt, which distance depends in part on the material being secured and the operating environment, beyond which sealing contact cannot be ensured. The radially inner wall at the flange of the annular chamber, for circumferentially distributing input steam to the reheat section and defined by the inner shell, is generally too far displaced from any bolt disposed through the bolting flange to ensure sealing contact between another mateable flange and the radially inner wall of the annular chamber from another section of the inner shell. Further, the inner shell is subject to a temperature differential across it due to operating parameters of the steam. For example, inlet steam temperature may be about 1000° F. (which is also the steam temperature in the annular chamber) and the temperature of steam around the outer periphery of the inner shell, i.e. in the cavity between the inner and outer shell, may be about 800° F. This temperature differential across the mateable joint surfaces causes unequal circumferential elongation or expansion across the sealing flange and inner wall of the annular chamber. The inner wall of the annular chamber is generally disposed beyond the maximum efficient sealing distance from any flange bolts and may circumferentially expand more than the outer wall of inner shell, even though it has a smaller circumference, resulting in a potential gap or steam leakage path between the steam inlet chamber and annular chamber, and the volume between the inner and outer shell. Another potential steam leakage path is between the annular chamber and the second stage of the reheat section (wherein steam pressure is less than at the input to the first stage, since it has already been expanded through the first stage).

Prior attempts to seal joints against the undesirable passage of steam have employed a key disposed in a keyway wherein a part of the keyway was formed into each of the mating sealing faces. Because of the inherent nature of machines necessary for fabricating such keyways and the close tolerances required in order to prevent eventual steam leakage, it is very difficult to form such a keyway so that mating portions of the keyway will register exactly, especially when it is required that the keyway be skewed with respect to the rotational axis of the turbine. Improper mating and registration of respective keyway portions may result in an ineffective steam seal and eventual steam leakage.

Accordingly, it is an object of the present invention to provide sealing apparatus for a joint of a steam turbine shell wherein registratable mating keyway portions in each section of the mating faces of the joint are eliminated.

Another object of the present invention is to provide sealing apparatus for a joint of a steam turbine shell which may be skewed with respect to the rotational axis of the steam turbine.

SUMMARY OF THE INVENTION

In accordance with the present invention, apparatus for preventing flow of a fluid in the interface between a first component of a fluid turbine and a second component of a fluid turbine, the first and second component respectively including a first and a second mutually mateable surface, respectively, comprises a member having a surface contour conforming to at least a first portion of the first mateable surface, biasing means for urging the member against the first mateable surface so that the surface contour of the member sealingly conforms to the at least a first portion of the first mateable surface and relief means disposed in the second component and terminating in the second mateable surface, the relief means for receiving the biasing means and the member such that at least a second portion of the first mateable surface is sealingly engageable with the second mateable surface. A predetermined area of the second surface proximate the relief means may be relieved for permitting movement of the relieved area toward the first surface while maintaining sealing engagement between the second portion of the first mateable surface and the remainder of the second mateable surface excluding the relieved area. The relief means may include a keyway such that a key may be sealingly disposed therein.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

The present invention relates to apparatus for sealing a joint of a shell of a fluid turbine. The apparatus may be used in combination with any joint requiring sealing and may be oriented at any angle with respect to the axis of rotation of the turbine to provide effective sealing. For purposes of illustration and for ease of description, its use for sealing a joint of the inner shell of a double flow reheat portion of a steam turbine, for which it is deemed especially well adapted, will be described. However, it is to be understood that the present invention may be applied to any turbine, regardless of the working fluid used.

Figure 1:
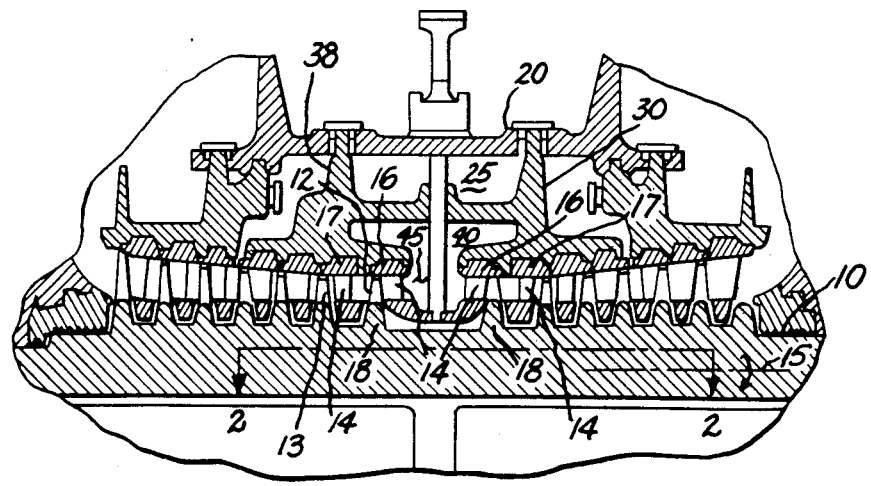
FIG. 1 is a cutaway elevational view of a double flow reheat secton of a steam turbine.

Referring to FIG. 1, a cutaway elevational view of a double flow reheat secton of a steam turbine is shown. The reheat section of the turbine includes a rotor 10 having an axis of rotation 15, a plurality of rows of radially outwardly extending turbine blades, or buckets, such as indicated at 12 and 13, fixedly secured to the outer periphery of rotor 18 and rotatable therewith, a plurality of rows of radially extending nozzle partitions 14 fixedly secured to diaphragm rings, such as indicated at 16 and 17, for respectively directing steam flow into associated buckets 12 and 13, respectively, an inner shell 30 disposed radially outward from the tips of buckets 12 and 13 and circumferentially surrounding rotor 10 and buckets 12 and 13, and an outer shell 20 spaced from and circumferentially surrounding inner shell 30 to form a steam cavity 25 therebetween. Diaphragm rings 16 and 17 are fixedly secured to the inner peripheral surface of inner shell 30.

Inner shell 30 also defines an annular chamber 40 for distributing steam from the steam input (not shown) (such as from a conduit in flow communication with chamber 40) of the reheat section to input region 45 of the opposingly disposed first stages of the double-flow reheat section.

Figure 3:
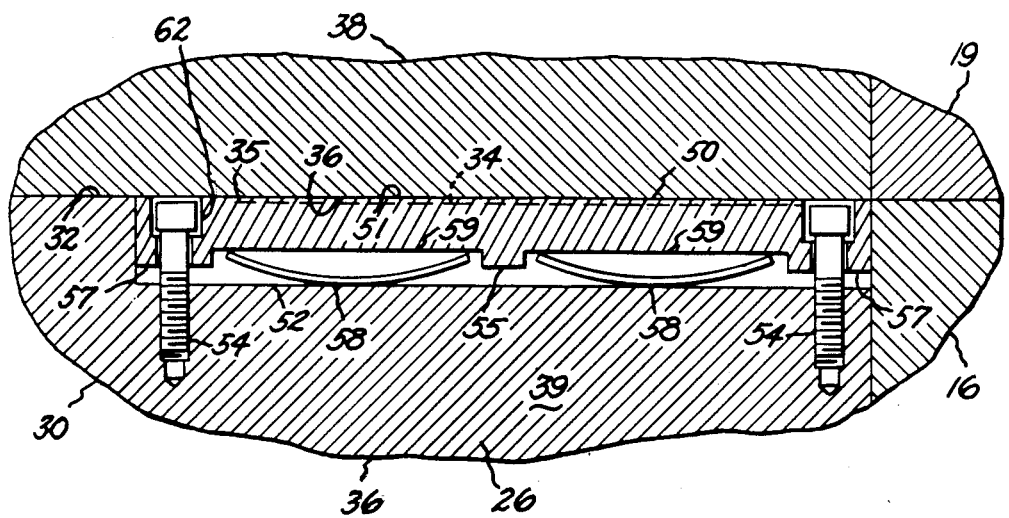
FIG. 3 is a partial sectional view looking in the direction of the arrows of line 3—3 of FIG. 2.
Figure 2:
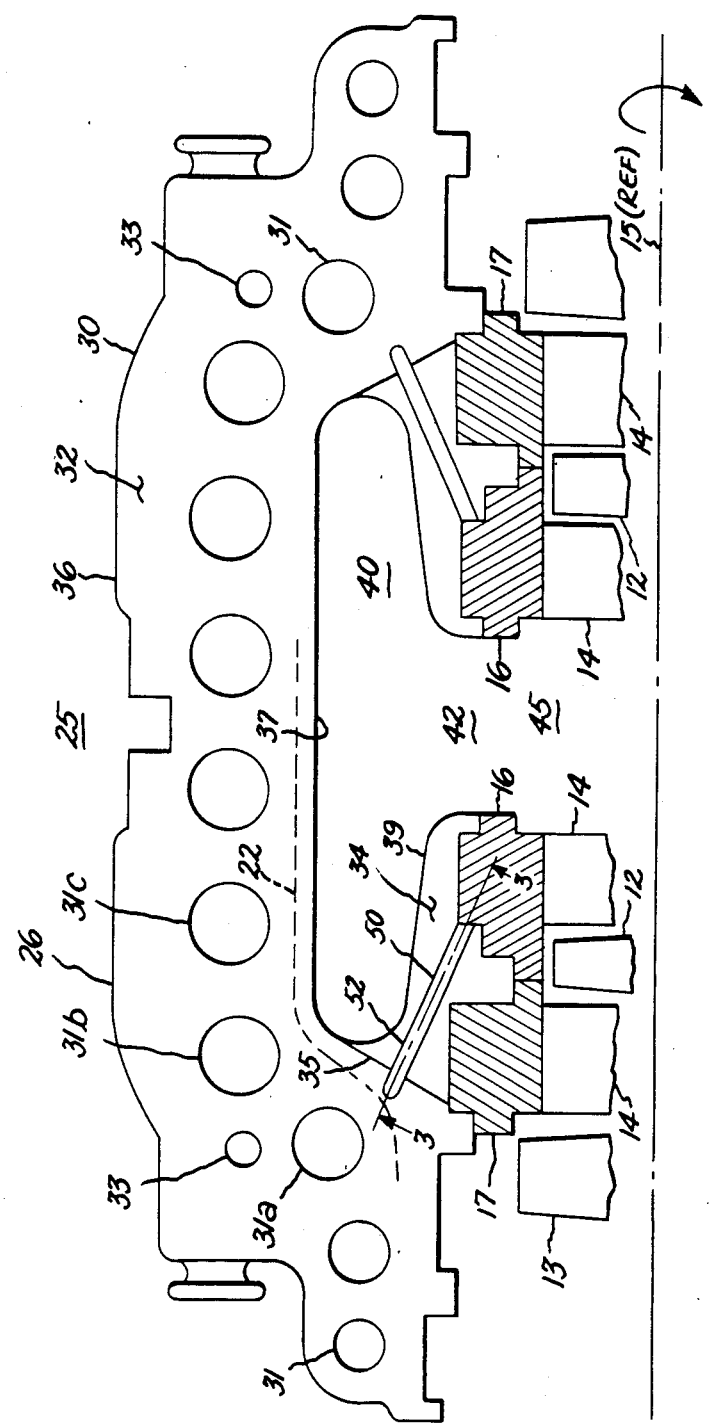
FIG. 2 is an enlarged view of the sealing surface of the inner shell of the reheat section of FIG. 1 looking in the direction of the arrows of line 2—2 of FIG. 1.

Referring to FIG. 2, an enlarged view of a sealing surface 32 of a flange 26 of the lower half portion 36 of inner shell 30 is shown. For ease of manufacture and assembly, inner shell 30 is typically fabricated in two halves, such as lower half portion 36 and upper half portion 38 (shown in part in FIGS. 1 and 3) with each half including a pair of matable surfaces (one of which is shown at 32), mutually respectively sealingly mateable with a corresponding respective mating surface 60 (FIG. 3) of a flange 28 (FIG. 3) of upper half portion 38 of inner shell 30. Assembled mating surfaces 32 and 60 prevent fluid flow across surfaces 32 and 60, or through the joint formed by mated surfaces 32 and 60. A plurality of bolting holes 31 for receiving bolts may be provided in flange 26 with a corresponding registrable plurality of bolting holes (not shown) provided in flange 28 (FIG. 3). The bolts are inserted and secured to force sealing contact between mating surface 32 of lower half portion 36 and the corresponding mating surface 60 (FIG. 3) of upper half portion 38 of shell 30. Alignment holes 33 may be provided for receiving a stud on one mating surface in order to facilitate assembly of the halves 36 and 38 of shell 30 and registration of holes 31 of flanges 26 and 28.

An inner wall 37 of shell 30 in part defines annular steam input chamber 40. Wall 37 generally progresses radially inward toward intersection with the generally radially innermost portion of lower shell portion 36 to form an annularly extending partition 39 between chamber 40 and at least first and second stage diaphragm rings 16 and 17, along with associated buckets 12 and 13. Partition 39 is spaced from its oppositely disposed counterpart to form a fluid path 42 between chamber 40 and first stage input region 45. The portion of mating surface 32 intersecting partition 39 is generally inwardly radially disposed between first and second diaphragm rings 16 and 17 and chamber 40. The portion of mating surface 32 intersecting partition 39 is also generally beyond the maximum effective sealing distance (indicated for reference by line 22) from bolt holes 31a, 31b, 31c and 31d closest to partition 39.

Disposed in partition 39 is an elongated relief means, such as a keyway, 52 terminating at surface 32 and having a longitudinal axis coextensive with line 3—3, which axis may be skewed with respect to the axis of rotation 15 of rotor 10 (FIG. 1) and which orientation is shown for reference in FIG. 2. Operationally disposed in keyway 52 is an elongated key 50 having one end terminating at and sealingly abutting first stage diaphragm ring 16. Keyway 52, having key 50 disposed therein, is further disposed to prevent steam leakage flow from chamber 40 directly into the second stage past second stage diaphragm ring 17, without first flowing through the first stage.

In the region of partition 39, surface 32 may be relieved to form a surface 34 which intersects partition 39 in order to permit circumferential expansion of partition 39. For instance, surface 34 may be cast relieved during fabrication of lower half portion 36 of shell 30 or may be mechanically relieved after fabrication of lower half portion 36. Surface 34 extends to an interface margin 35 between surface 34 and surface 32. Interface margin 35 is directed from diaphragm ring 17 of the second stage to tangentially intersect wall 37 of chamber 40, thus permitting a portion of keyway 52 and key 50 to extend into and terminate in a portion of lower half portion 36 in which surface 32 has not been relieved.

Referring to FIG. 3, an enlarged partial view looking in the direction of the arrows of line 3—3 of FIG. 2 is shown (a portion of upper shell 38, flange 28 and upper diaphragm ring 19 has been included for ease of understanding). Key 50 is shown disposed in keyway 52. Key 50 includes a pair of transverse channels 59 on its underside for receiving respective biasing means 58, such as leaf springs, for sealingly urging key 50 against surface 60 of flange 28 of upper inner shell portion 38. Surface 60 of flange 28 is contoured to sealingly mate with upper surface 51 of key 50. Transverse lands 55 and 57 provide purchase surfaces for retaining the ends of spring 58. Spring 58 may comprise a chromium-molybdenum-vanadium alloy which is capable of withstanding operating temperatures of about 1000° F. in a steam environment and still maintaining desired bias force against key 50 for urging key 50 into sealing contact with surface 60 of flange 28. A single leaf spring or a coil spring or elastic material capable of supplying desired biasing force and of operating without adverse reaction at a temperature of about 1000° F. in a steam environment may be used. Guide means 54, such as a bolt, are provided to limit the outward (circumferential) travel of key 50 in keyway 52 during assembly. Key 50 includes a countersunk bore, or relief 62, for receiving the head of bolt 54 such that key 50 readily slides or traverses without binding along guide means 54 after assembly. Thus, surface 60 of flange 28 is sealingly mateable with surface 32 of flange 26 of lower shell portion 36 without need of any part of keyway 52 or any other structure extending into upper shell portion 38 through surface 60. This permits keyway 52 to be skewedly disposed with respect to axis 15 of rotor 10 (FIG. 1) while still maintaining a sealed joint between surfaces 32 and 60.

Referring again to FIG. 1, for a reheat section of a steam turbine, the input steam temperature in chamber 40 and in steam input region 45, which is in fluid flow communication with chamber 40, may be about 1000° F. at a pressure of about 671 psia, whereas the steam temperature in annular cavity 25 may be about 808° F. at a pressure of about 321 psia and the steam temperature at the input to the second stage may be about 966° F. at a pressure of about 555 psia. Although partition 39 (FIG. 2) has a lesser diameter than the radial outer periphery of shell 30, circumferential expansion of partition 39 (exposed to about 1000° F.) may be greater than circumferential expansion of the radial outer periphery of shell 30 (exposed to about 808° F.). For example, assuming the coefficient of circumferential expansion at 1000° F. is about 7.25 mils/circumferential inch and at 808° F. is about 5.55 mils/circumferential inch and further assuming that the outer diameter of shell 30 is 77 inches and the diameter of partition 39 at the radial outer portion thereof is 61 inches, then the outer periphery of shell 30 will expand $(\pi)(77)(0.00555) = 1.342$ inches and the outer periphery of partition 39 will expand $(\pi)(61)(0.00725) = 1.389$ inches or a difference of 0.047 inches more expansion for partition 39. Surface 34 is relieved from surface 32 at least enough to compensate for the expected difference in expansion between partition 39 and the outer periphery of shell 30. Also, relief of surface 34 is generally evenly apportioned between each mating surface 32 of shell partition 39. Thus, surface 34, for the above example, would typically be relieved at least 0.024 inches from surface 32 at each shell portion 39. Further, there may be applications wherein the benefits of configuring key 50 and keyway 52 in accordance with the present invention at a joint to be sealed can be experienced without having to relieve a portion of the mating surface in the keyway region, such as wherever it is desired to ensure sealing and an extreme temperature differential across the joint does not exist.

In attempting to seal mating surfaces 32 and 60 (FIG. 3) without employing applicant's invention, mating surfaces 32 and 60 would be sealingly abutted and secured by bolts 31. As steam is applied to annular chamber 40 and steam cavity 25, shell portions 36 and 38 begin to circumferentially expand an unequal expansion, as hereinbefore described, causes the portion of surface 32 that intersects partition 39 of lower shell portion 36 and the portion of surface 60 that intersects a corresponding partition (not shown) of upper shell portion 30 to be forced together, thereby exerting a force directed to separate surfaces 32 and 60 in the region of bolts 31 and resulting in potential steam leakage between annular chamber 40 and steam cavity 25. By employing applicant's invention, surface 34 of partition 39 is relieved from surface 32 and bolts 31 can then sealingly secure the radially outer portion of surfaces 32 and 60, since the amount of relief provided for surface 34 is adequate to ensure that surface 34 does not forcibly contact surface 60. When disposed in keyway 52, key 50 prevents steam leakage between chamber 40 and the second and further downstream stages of the reheat section while permitting surfaces 32 and 60 to maintain sealing contact. Further, by relieving surface 34 to allow for the expected maximum additional circumferential expansion of partition 39 over total circumferential expansion of the outer radial periphery of shell 30, springs 58 will cause key 50 to maintain continuous sealing contact with surface 60, thereby maintaining sealing efficiency during changes in steam operating conditions. The height of key 50 is arranged so that upon maximum extension from the base of keyway 52, the side surfaces and perimeter of key 50 maintain sealing contact with the sidewalls and perimeter of keyway 52.

Thus has been illustrated and described sealing apparatus for a joint of steam turbine shell wherein mating keyway portions in each section of the shell are eliminated and wherein the apparatus may be skewedly disposed with respect to the axis of rotation of the steam turbine.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. Apparatus for preventing flow of a fluid through the interface between a first component comprising one-half of an inner shell of a steam turbine and a second component comprising another one-half of the inner shell of a steam turbine, the first and second component respectively including a first and a second mateable surface, respectively, the first mateable surface mateable with the second mateable surface, said apparatus comprising:
   a first member having a surface contour conforming to at least a first portion of said first mateable surface;
   first biasing means coupled to said first member for urging said first member against said first mateable surface so that the surface contour of said first member sealingly engages said at least first portion of said first mateable surface; and
   first relief means disposed in said second component and terminating in said second mateable surface, said first relief means for sealingly receiving said first member and said biasing means such that at least a second portion of said first mateable surface is sealingly engageable with said second mateable surface.

2. The apparatus as in claim 1, wherein said second surface is relieved over a first predetermined area proximate said first relief means for permitting movement of the first relieved area of said second surface toward said first surface, while maintaining sealing engagement between said second portion of said first mateable surface and the remainder of said second mateable surface excluding the first relieved area.

3. The apparatus as in claim 1, wherein the steam turbine includes a rotor having an axis of rotation and further wherein said first member includes an axis such that the axis of said first member is skewedly disposable with respect to the axis of rotation of the rotor.

4. The apparatus as in claim 3, wherein said first member is elongated and the axis of said first member includes the longitudinal axis of the first member.

5. The apparatus as in claim 4, wherein said first relief means includes a keyway and said first member includes a key disposable in said keyway.

6. The apparatus as in claim 1, wherein said first biasing means includes an elastic material.

7. The apparatus as in claim 1, wherein said first biasing means includes a spring.

8. The apparatus as in claim 7, wherein said spring is a leaf spring.

9. The apparatus as in claim 8, wherein said leaf spring comprises an alloy including chromium, molybdenum and vanadium.

10. The apparatus as in claim 1, wherein said one-half of the inner shell includes a first and a second radially inwardly disposed spaced apart partition, respectively defining in part an annular chamber, each of said first and second partition terminating in said second mateable surface, and further wherein said another half of the inner shell includes a third and a fourth radially inwardly disposed spaced apart partition, respectively defining in part the annular chamber, each of said third and fourth partition terminating in said first mateable surface, wherein said first relief means is disposed at least in part in said first partition.

11. The apparatus as in claim 10, further including second relief means disposed at least in part in said second partition, a second member having a surface contour conforming to at least a third portion of said first mateable surface and second biasing means for urging said second member against said first mateable surface so that the surface contour of said second member sealingly conforms to at least a fourth portion of said first mateable surface.

12. The apparatus as in claim 11, wherein said second surface is relieved over a second predetermined area proximate said second relief means for permitting movement of the second relieved area of said second surface toward said first surface, while maintaining sealing engagement between said second portion of said first mateable surface and the remainder of said second mateable surface excluding the second relieved area.

13. In a steam turbine including a rotor and a shell for circumferentially surrounding the rotor, the shell including a first and a second radially inwardly disposed and spaced apart partitions respectively defining in part an annular chamber, the shell further including a joint defined by mutually mateable first and second surfaces of the shell, sealing means comprising:
   a first member having a surface contour conforming to at least a first portion of said first surface;
   first biasing means coupled to said first member for urging said first member against said first surface so that the surface contour of said first member sealingly engages said at least a first portion of said first surface; and
   first relief means disposed in said first partition and terminating in said second surface for sealingly receiving said first member and said first biasing means such that at least a second portion of said first surface is sealingly engageable with said second mateable surface.

14. The combination as in claim 13, wherein said second surface is relieved over a first predetermined area proximate said first relief means for permitting movement of the first relieved area of said second surface toward said first surface while maintaining sealing engagement between said second portion of said first surface and the remainder of said second mateable surface excluding the first relieve area.

15. The combination as in claim 14, wherein said turbine further includes at least a first first and a first second stage and said first relief means is further disposed for sealingly receiving said first member so as to prevent fluid flow at least between said annular chamber and said first second stage.

16. The combination as in claim 14, wherein said first predetermined area includes a surface of said first partition.

17. The combination as in claim 13, further comprising:
   a second member having a surface contour comforming to at least a third portion of said first surface;
   second biasing means coupled to said second member for urging said second member against said first surface so that the surface contour of said second member sealingly engages said at least a third portion of said first surface; and
   second relief means disposed in said second partition and terminating in said second surface for sealingly receiving said second member and said second biasing means such that at least a fourth portion of said first surface is sealingly engageable with said second mateable surface.

18. The combination as in claim 17, wherein said second surface is relieved over a second predetermined area proximate said second relief means for permitting movement of the second relieved area of said second surface toward said first surface while maintaining sealing engagement between said fourth portion of said first surface and the remainder of said second mateable surface excluding the second relieved area.

19. The combination as in claim 18, wherein said turbine further includes at least a second first and a second second stage and said second relief means is further disposed for sealingly receiving said first member so as to prevent fluid flow at least between said annular chamber and said second second stage.

20. The combination as in claim 18, wherein said second predetermined area includes a surface of said first partition.

21. The combination as in claim 14, wherein said first biasing means includes a spring.

22. The combination as in claim 21, wherein said spring comprises an alloy including chromium, molybdenum and vanadium.

23. The combination as in claim 18, wherein said second biasing means includes a spring.

24. The combination as in claim 23, wherein said spring comprises an alloy including chromium, molybdenum and vanadium.

25. The combination as in claim 14, wherein said first relief means includes a keyway.

26. The combination as in claim 18, wherein said second relief means includes a keyway.

27. The combination as in claim 14, wherein the turbine includes a rotor and further wherein said first member is elongated and the longitudinal axis of said first member is skewedly disposable with respect to the axis of rotation of the rotor.

28. The combination as in claim 18, wherein the turbine includes a rotor and further wherein said second member is elongated and the longitudinal axis of said second member is skewedly disposable with respect to the axis of rotation of the rotor.

* * * * *